United States Patent [19]

Markusch et al.

[11] Patent Number: 4,826,894

[45] Date of Patent: May 2, 1989

[54] AQUEOUS POLYURETHANE-UREAS DISPERSIONS AND THEIR USE FOR THE PRODUCTION OF COATINGS HAVING IMPROVED HUMIDITY RESISTANCE

[75] Inventors: Peter H. Markusch, McMurray; James W. Rosthauser, Imperial, both of Pa.

[73] Assignee: Mobay Corporation, Pittsburgh, Pa.

[21] Appl. No.: 52,093

[22] Filed: May 19, 1987

[51] Int. Cl.$^4$ .................. C08L 63/00; C08L 75/12
[52] U.S. Cl. .................. 523/415; 525/418; 525/454
[58] Field of Search .............. 523/415; 525/418, 454

[56] References Cited

U.S. PATENT DOCUMENTS

| | | | |
|---|---|---|---|
| 3,479,310 | 11/1969 | Dieterich et al. | 260/29.2 |
| 3,663,652 | 5/1972 | Cannon et al. | 260/830 |
| 3,870,684 | 3/1975 | Witt et al. | 260/75 |
| 3,931,116 | 1/1976 | Bernstein et al. | 260/77.5 |
| 3,971,745 | 7/1976 | Carlson et al. | 260/29.2 |
| 4,036,906 | 7/1977 | Finelli | 260/830 |
| 4,066,591 | 1/1978 | Scriven et al. | 260/29.2 |
| 4,092,286 | 5/1978 | Noll et al. | 260/29.2 |
| 4,108,814 | 8/1978 | Reiff et al. | 260/29.2 |
| 4,160,065 | 7/1979 | Loewrigkeit et al. | 428/425 |
| 4,190,567 | 2/1980 | Ohmura et al. | 260/29.2 |
| 4,203,883 | 5/1980 | Hangauer | 260/29.2 |
| 4,237,264 | 12/1980 | Noll et al. | 528/67 |
| 4,238,378 | 12/1980 | Markusch | 260/29.2 |
| 4,306,998 | 12/1981 | Wenzel | 260/13 |
| 4,403,085 | 9/1983 | Christenson et al. | 528/45 |
| 4,408,008 | 10/1983 | Markusch | 524/591 |
| 4,501,852 | 2/1985 | Markusch et al. | 524/591 |
| 4,572,863 | 2/1986 | Chung | 523/415 |

OTHER PUBLICATIONS

Witco Chemical, Bulletin #345, Jan. 1980, Witcobond W-290H.

*Primary Examiner*—C. Warren Ivy
*Attorney, Agent, or Firm*—Gene Harsh; Joseph C. Gil; Thomas W. Roy

[57] ABSTRACT

The present invention is directed to stable, aqueous dispersions of polyurethane-ureas which are formed by dispersing a blend of anionically modified isocyanate terminated prepolymer and epoxy resin in water and chain extending said dispersed blend with a polyamine having an average functionality of about 2.0 to 6.0 in an amount sufficient to provide a ratio of amino groups to isocyanate groups of about 0.6:1.0 to 1.0:1.0.

The present invention is also directed to the use of the aqueous polyurethane-urea dispersions for the production of coated substrates having improved humidity resistance.

14 Claims, No Drawings

AQUEOUS POLYURETHANE-UREAS DISPERSIONS AND THEIR USE FOR THE PRODUCTION OF COATINGS HAVING IMPROVED HUMIDITY RESISTANCE

BACKGROUND OF THE INVENTION

1. Field of the Invention

The present invention is directed to the production of stable aqueous polyurethane-urea dispersions which contain epoxide resins that are not dispersible in water and the use of these dispersions for the production of coatings having improved humidity resistance.

2. Description of the Prior Art

The production of linear or cross-linked, aqueous, polyurethane-urea dispersions is known as shown by U.S. Pat. Nos. 3,479,310; 4,066,591: 4,092,286: 4,108,814; 4,237,264; and 4,238,378 which disclose linear polyurethane-ureas and U.S. Pat. Nos. 3,870,684; 4,203,883: and 4,408,008 which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers. However, one property of coatings prepared from aqueous polyurethane-urea dispersions which needs to be improved in order to match the performance of coatings prepared from solvent-based polyurethane lacquers is the humidity resistance. This property is adversely affected by the hydrophilic materials necessary for insuring the dispersibility of the polyurethane-ureas in an aqueous medium.

Accordingly, it is an object of the present invention to provide aqueous polyurethane-urea dispersions which may be used to prepare coatings having improved humidity resistance. It is an additional object of the present invention to provide aqueous polyurethane-urea dispersions which may be used to prepare coatings having excellent adhesion, chemical resistance, abrasion resistance, toughness, tensile strength, elasticity and durability.

Surprisingly, it has been found that these objectives may be achieved according to the present invention by mixing a water-dispersible isocyanate-terminated prepolymer with an epoxy resin which is not dispersible in water prior to dispersing the prepolymer in water and subsequently chain extending the prepolymer.

There have been many previous attempts to improve the hydrolytic stability or water resistance of polyurethane-ureas by the incorporation of epoxy resins. For example, U.S. Pat. Nos. 4,160,065 and 4,190,567 are directed to the production of cationic polyurethane-ureas with terminal amine groups which are subsequently reacted with epoxy resins in order to improve the water resistance of the resulting films or coatings. Conversely, U.S. Pat. Nos. 3,931,116 and 3,971,745 are directed to the production of anionic polyurethane-ureas having terminal amino groups which are subsequently chain extended with epoxy resins to improve the water resistance. U.S. Pat. No. 4,036,906 is directed to blends of polyurethane prepolymers, with epoxy resins which are subsequently chain extended with polyamines in order to improve the water resistance of the resulting coatings. Finally, U.S. Pat. No. 4,403,085 is directed to blends of blocked isocyanate-terminated prepolymers and epoxy resins which are subsequently cured to form films having improved properties.

In most of the preceding references, it is stated that the water resistance of the resulting films and coatings is improved. In these instances "water resistance" refers to immersing the films or coatings in water for a period of at least several hours and then retesting the coatings to determine if there has been any reduction in the tensile properties of the coatings or films because of their immersion in water. It is known that the polyesters which are predominantly used to prepare the polyurethane-ureas or the amine-terminated polyurethane-ureas are susceptible to attack by water. It is also known that epoxy resins may be chain extended with amines in the same manner as isocyanate-terminated prepolymers. Accordingly, the improvement shown by these references may be explained by the fact that a portion of the isocyanate-terminated prepolymer is replaced by an epoxy resin and subsequently both of these components are chain extended with an amine. The result is that the final product contains less of the polyurethane-ureas and, accordingly, less of the degradable polyester resins, resulting in improved water resistance.

To the contrary, the present invention is directed to a mixture of stable, aqueous polyurethane-urea dispersions with epoxy resins which are not water dispersible. The epoxy resins are not reacted with the aqueous polyurethane-urea dispersions until the coating is cured on the substrate at elevated temperatures. At this time, the epoxide groups react with the acid groups which are the precursors of the anionic hydrophilc groups which provide hydrophilicity for dispersing the aqueous polyurethane-urea dispersions.

U.S. Pat. No. 4,306,998 is directed to a process for preparing aqueous polyurethane-urea dispersions containing additives which are not soluble or dispersible in water by incorporating these additives with the water-dispersible, isocyanate-terminated prepolymer precursors for the polyurethane-urea dispersions. Evan though this reference includes epoxy resins among an extensive list of additives which may be incorporated, this reference does not recognize the improvements in humidity resistance which may be obtained incorporating epoxy resins in accordance with the present invention.

Finally, Bulletin 345 from Witco Chemical Corporation concerning Witcobond W-290H urethane latex suggests the incorporation of a water dispersible epoxy for the purpose of improving the water resistance of the resulting coatings or films after 24 hours immersion in water.

SUMMARY OF THE INVENTION

The present invention is directed to stable, aqueous dispersions of polyurethane-ureas which are formed by
(a) preparing isocyanate-terminated prepolymers containing about 5 to 190 milliequivalents per 100 grams of polyurethane-urea of chemically incorporated potential anionic groups and/or anionic groups and up to about 10% by weight, based on the weight of the polyurethane-urea, of lateral and/or terminal hydrophilic chains in containing ethylene oxide units, (b) converting a sufficient amount of the potential anionic groups to anionic groups either before, during or after preparing the prepolymer such that the blend of step (c) can be stably dispersed in water, wherein at least about 50% of the counterions of the anionic groups are derived from volatile organic compounds, (c) blending said prepolymer either before, during or after step (b) with an epoxy resin which is not dispersible in water and contains at least one epoxide group, such that the equivalent ratio of potential anionic groups and anionic groups having counterions derived from volatile organic compounds to epoxide groups, is about 0.2 to 20.0, (d) dispersing the blend of prepolymer and epoxy resin in water and (e) chain extending said dispersed blend with a polyamine having an average functionality of about 2.0 to 6.0 in an amount sufficient to provide a ratio of amino groups to isocyanate groups of about 0.6:1.0 to 1.0:1.0.

The present invention is also directed to the use of the aqueous polyurethane-urea dispersions for the production of coated substrates having improved humidity resistance.

DETAILED DESCRIPTION OF THE INVENTION

In accordance with the present invention the epoxy resins which are not dispersible in water are codispersed into water with water-dispersibe, isocyanate-terminated prepolymers. Suitable epoxy resins include those containing one or more, preferably two or more and most preferably two epoxide groups. The epoxy resins may be prepared from aliphatic, cycloaliphatic or, preferably, aromatic monoalcohols, diols or polyols. Illustrative of suitable dihydric phenols are 2,2-bis(4-hydroxyphenyl)propane, 2,2-bis(3-bromo-4-hydroxyphenyl)-propane, 2,2-bis(3-chloro-4-hydroxyphenyl)-propane, bis(4-hydroxyphenyl)methane, bis(4-hydroxyphenyl)-sulphone, bis(4-hydroxyphenyl)-sulphide, resorcinol, hydroquinone and the like. The preferred dihydric phenols are 2,2-bis(4-hydroxyphenyl)propane (bisphenol A) and bis(4-hydroxyphenyl)methane for reasons of cost and availability.

The epoxy resins are prepared by the reaction of a dihydric phenol with a halogen-containing epoxide or dihalohydrin in the presence of an aqueous medium. By varying the ratios of the dihydric phenol and epichlorohydrin reactants, different molecular weight products can be obtained as described in U.S. Pat. Nos. 2,582,985; 2,615,007 and 2,633,458.

Since it is primarily the presence of the epoxide groups and not the length of the backbone connected to these groups which provides the improvements in humidity resistance in accordance with the present invention, it is preferred to use low molecular weight epoxides due to their lower viscosity such as the diepoxides of low molecular weight hydroxy functional compounds. Aromatic diepoxides such as those based on bisphenol A are most preferred due to their higher reactivity when compared to the aliphatic or cycloaliphatic epoxides. Suitable hydroxyl compounds for preparing these cycloaliphatic epoxides include the hydrogenated derivatives of the abovementioned dihydric phenols, while the aliphatic epoxide resins may be prepared using any of these low molecular weight chain extenders containing one or more hydroxyl groups set forth hereinafter for the preparation of the high molecular weight polyols.

Monoepoxides may also be used in accordance with the present invention and include aliphatic, cycloaliphatic or, preferably, aromatic monoepoxides. The monoepoxides may be prepared by reacting the corresponding monoalcohols with a halogen-containing epoxide such as epichlorohydrin.

Other suitable compounds for connecting the epoxide groups can be prepared from compounds containing one or more carboxylic acid groups or their anhydrides, one or more amino groups, dienes and other compounds known in the art. Other suitable epoxy resnns include epoxidized fatty acid esters such as epoxidized soybean oil, the cycloaliphatic epoxides disclosed at column 8 of the U.S. Pat. No. 4,212,781 (herein incorporated by reference) and the epoxy resins disclosed at columns 1–3 of U.S. Pat. No. 4,569,951 (herein incorporated by reference).

While the aromatic diepoxides are preferred due to their low cost and availability, it is possible in accordance with the present invention to use any compounds containing epoxide groups which are not dispersible in water. The epoxy resins may have molecular weights of up to about 10,000: however, those which have epoxide equivalent weights below 1,000, preferably below 500 and most preferably less than about 250 are preferred.

When the aqueous polyurethane-urea dispersions containing epoxy resins are cured at elevated temperature, the epoxide groups react with the potential anionic groups of the polyurethane-urea and with the anionic groups which have counterions derived from volatile organic compounds. It is believed that potential anionic groups neutralized with volatile organic compounds are reformed at elevated temperatures. The amount of the epoxy resin is selected such that the minimum equivalent ratio of potential anionic groups and anionic groups having counterions derived from volatile organic compounds to epoxide groups is about 0.2, preferably about 0.5 and most preferably about 1.0. The maximum equivalent ratio is about 20.0, preferably about 15.0 and most preferably about 10.0.

The isocyanate-terminated prepolymers of the present invention are prepared from (a) organic polyisocyanates which contain at least two isocyanate groups, (b) organic compounds which have at least two isocyanate-reactive groups, (c) organic compounds which are monofunctional or difunctional in the context of the isocyanate-polyaddition reaction and which contain anionic groups or potential anionic groups and, optionally, (d) organic compounds which are monofunctional or difunctional in the context of the isocyanate-polyaddition reaction and which contain lateral and/or terminal hydrophilic ethylene oxide units.

Examples of suitable polyisocyanate components (a) to be used in preparing the isocyanate-terminated prepolymers in accordance with the present invention are organic polyisocyanates, preferably diisocyanates represented by the formula

in which R represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above, in which R represents a divalent aliphatic hydrocarbon group having from 4 to 18 carbon atoms, a divalent cycloaliphatic hydrocarbon group having from 5 to 15 carbon atoms, an araliphatic hydrocarbon group having from 7 to 15 carbon atoms or an aromatic hydrocarbon group having 6 to 14 carbon atoms. Examples of the organic polyisocyanates which are particularly suitable for the process include 1,4-tetramethylene diisocyanate; 1,6-hexamethylene diisocyanate; 2,4,4-trimethyl-1,6-hexamethylene diisocyanate; 1,12-dodecamethylene diisocyanate; cyclohexane-1,3- and/or -1,4-diisocyanate; 1-isocyanato-2-isocyanatomethyl cyclopentane; 1-isocyanato-3-isocyanatomethyl-3,5,5-trimethylcyclohexane; bis-(4-isocyanatocyclohexyl)-methane; 1,3- and 1,4-bis(isocyanatomethyl)cyclohexane; bis-(4-isocyanato-3-methyl-cyclohexyl)-methane α,α,α',α'-tetramethyl-1,3- and/or -1,4-xylylene diisocyanate; 1-isocyanato-1-methyl-4(3)-isocyanatomethyl cyclohexane; 2,4- and/or 2,6-hexahydrotoluylene diisocyanate; 1,3- and 1,4-phenylene diisocyanate; 2,4- and/or 2,6-toluylene diisocyanate; 2,4'- and/or 4,4'-diphenylmethane diisocyanate; 1,5-naphthalene diisocyanate; 4,4',4''-triphenylmethane diisocyanate; and polyphenyl polymethylene polyisocyanates obtained by phosgenating aniline/formaldehyde condensates. Mixtures of polyisocyanates can, of course, be used.

The organic compounds (b) containing at least two isocyanate-reactive groups can be divided into two groups, i.e., high molecular weight compounds with molecular weights from 400 to about 6,000, preferably 400 to about 3,000, and low molecular weight compounds with molecular weights below 400. Examples of the high molecular weight compounds are:

(1) polyhydroxyl polyesters which are obtained from polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachloro-phthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephtalate and bis-glycol terephthalate. Suitable polyhydric alcohols include ethylene glycol, propylene glycol-(1,2), propylene glycol-(1,3), diethylene glycol, butanediol-(1,4), butanediol-(1,3), hexanediol-(1,6), octanediol-(1,8), neopentyl glycol, 2-methyl-1,3-propanediol, 2,2,4-trimethyl-1,3-pentanediol, the various isomeric bishydroxymethyl cyclohexanes, glycerine, trimethylolpropane and the like.

(2) Polylactones generally known from polyurethane chemistry, e.g., polymers of caprolactone initiated with the above-mentioned polyhydric alcohols.

(3) Polycarbonates containing hydroxyl groups such as the products obtained from the above-mentioned polyhydric alcohols, preferably dihydric alcohols, such as 1,3-propane diol, 1,4-butane diol, 1,4-dimethylol cyclohexane, 1,6-hexane diol, diethylene glycol, triethylene glycol or tetraethylene glycol with phosgene, diaryl carbonates such as diphenyl carbonate or with cyclic carbonates such as ethylene or propylene carbonate. Also suitable are polyester carbonates obtained from the above-mentioned polyesters or polylactones with phosgene, diaryl carbonates or cyclic carbonates.

(4) Polyethers including the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than about 10% by weight of ethylene oxide, however, polyethers which do not contain ethylene oxide are generally used. The preferred starting compounds containing at least one reactive hydrogen atom include the polyols set forth as suitable for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Suitable amine starting compounds include: amonia, methyl amine, tetramethylene diamine, ethanolamine, diethanol amine, triethanolamine, ethylene diamine, diethylene triamine, triethylene tetramine, 1,6-hexane diamine, piperazine, 2,5-dimethyl piperazine, 1-amino-3-aminomethyl-3,5,5-trimethyl-cyclohexane, bis-(4-amino-cyclohexyl)-methane, bis-(4-amino-3-methyl-cyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials. Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351: 3,304,273: 3,523,095: and 3,110,695: and German Pat. No. 1,152,536). Also suitable as polyethers are amino polyethers wherein at least a portion of the hydroxyl groups of the previously described polyethers are converted to amino groups. The preferred starting compounds for the polyethers are those compounds which exclusively contain hydroxyl groups, while compounds containing tertiary amine groups are less preferred and compounds containing isocyanate-reactive —NH groups are much less preferred.

(5) Polythioethers such as the condensation products obtained from thiodiglycol on its own and/or with other glycols, dicarboxylic acids, formaldehyde, amino carboxylic acids, or amino alcohols. The products are either polythio mixed ethers, polythio ether esters, or polythioether ester amides, depending on the co-components.

(6) Polyacetals including those obtained from the above-mentioned polyhydric alcohols, especially diethylene glycol, triethylene glycol, 4,4'-dioxyethoxy-diphenyldimethylene, 1,6-hexane diol and formaldehyde.

Polyacetals suitable for use in the invention may also be prepared by the polymerization of cyclic acetals.

(7) Polyether esters containing isocyanate-reactive groups and known in the art.

(8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

The compounds of the above-described type preferably used in the process according to the invention are dihydroxy polyesters, dihydroxy polylactones, dihydroxy polycarbonates, and dihydroxy polyester carbonates.

The low molecular weight compounds having molecular weights below 400 which may be used in the process for the preparation of the isocyanate-terminated prepolymers include, for example, the low molecular weight diols and diamines which have been described for the preparation of polyester polyols and polyether polyols, respectively.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

The reaction components which ensure the dispersibility of the polyurethanes herein include compounds containing anionic group(s) or potential anionic group(s) (c) and, optionally, compounds containing lateral or terminal, hydrophilic ethylene oxide units (d). Component (c) is used in an amount sufficient to provide an anionic group content of about 5 to 190 milliequivalents, preferably about 10 to 120 milliequivalents and most preferably about 20 to 80 milliequivalents per 100 grams of prepolymer. Component (d) is used in an amount sufficient to provide a content of hydrophilic ethylene oxide units of up to about 10% by weight, preferably up to about 8% by weight, more preferably about 1.0 to 6.0% by weight, and most preferably about 2.0 to 6.0% by weight, based on the weight of the prepolymer. Components (c) and (d) may be either monofunctional or difunctional in the context of the isocyanate-polyaddition reaction. Suitable compounds include:

(c) an anionic hydrophilic component selected from
  (i) monoisocyanates or diisocyanates which contain anionic group(s) or potential anionic group(s), and
  (ii) compounds which are monofunctional or difunctional in the isocyanate-polyaddition reaction and contain anionic group(s) or potential anionic group(s) and, optionally, (d) a nonionic hydrophilic component selected from
  (i) diisocyanates which contain lateral, hydrophilic ethylene oxide units,
  (ii) compounds which are difunctional in the isocyanate-polyaddition reaction and contain lateral, hydrophilic ethylene oxide units,
  (iii) monoisocyanates which contain terminal, hydrophilic ethylene oxide units,
  (iv) compounds which are monofunctional in the isocyanate-polyaddition reaction and contain terminal, hydrophilic ethylene oxide units, and
  (v) mixtures thereof.

The preferred hydrophilic component (c) contains potential anionic group(s) or their corresponding anionic group(s). Examples of anionic groups include $-COO^{\ominus}$ and $-SO_3^{\ominus}$. These anionic groups are formed by neutralizing the corresponding potential anionic groups either prior to, during or after forming the isocyanate-terminated prepolymer. When the potential anionic groups are neutralized prior to forming the isocyanate-terminated prepolymer, the anionic groups are incorporated directly. When neutralization is performed subsequent to forming the prepolymer, potential anionic groups are incorporated.

Suitable compounds for incorporating the previously discussed carboxylate and sulfonate groups are described in U.S. Pat. Nos. 3,479,310 and 4,108,814, the disclosures of which are herein incorporated by reference. The neutralizing agents for converting the potential anionic groups to anionic groups are also described in the above-mentioned U.S. patents. Within the context of this invention, the term "neutralizing agents" is meant to embrace all types of agents which are useful for converting potential anionic groups to anionic groups.

The preferred anionic groups for use in the present invention are carboxylate groups which may be introduced by using hydroxy-carboxylic acids of the formula:

$$(HO)_xQ(COOH)_y$$

wherein
(Q) represents a straight or branched, hydrocarbon radical containing 1 to 12 carbon atoms, and
x and y represent values from 1 to 3.

Examples of these hydroxy-carboxylic acids include citric acid and tartaric acid.

The preferred acids are those of the above-mentioned formula wherein $x=2$ and $y=1$. These dihydroxy alkanoic acids are described in U.S. Pat. No. 3,412,054, herein incorporated by reference. The more preferred group of dihydroxy alkanoic acids are the $\alpha,\alpha$-dimethylol alkanoic acids represented by the formula:

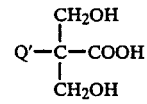

wherein Q' is hydrogen or an alkyl group containing 1 to 8 carbon atoms. The most preferred compound is $\alpha,\alpha$-dimethylol propionic acid, i.e., wherein Q' is methyl in the above formula. The difunctional hydrophilic components having lateral hydrophilic chains containing ethylene oxide units include compounds corresponding to the formula:

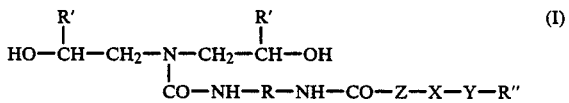

and/or compounds corresponding to the formula:

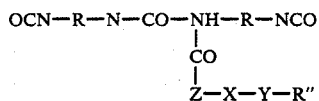
(II)

The difunctional hydrophilic components corresponding to formula (I) above are preferred over those corresponding to formula (II) above.

In formulae (I) and (II) above,

R represents a difunctional radical of the type obtained by removing the isocyanate groups from a diisocyanate corresponding to the formula:

R(NCO)$_2$ of the above-mentioned type;

R' represents hydrogen or a monovalent hydrocarbon radical containing from 1 to 8 carbon atoms, preferably a hydrogen atom or a methyl group:

R'' represents a monovalent hydrocarbon radical having from 1 to 12 carbon atoms, preferably an unsubstituted alkyl radical having from 1 to 4 carbon atoms;

X represents the radical obtained by removal of the terminal oxygen atom from a polyalkylene oxide chain having from about 5 to 90 chain members preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or —NR'''—wherein R''' has the same definition as R''; and

Z represents a radical which corresponds to Y, but may additionally represent —NH—.

The compounds corresponding to formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight, based on the polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

The preferred components for incorporating lateral or terminal hydrophilic chains containing ethylene oxide units include compounds corresponding to the formula:

H-Y'-X-Y-R'' and/or compounds corresponding to the following formula:

OCN-R-NH-CO-Z-X-Y-R'' wherein X, Y, Z, R and R'' are as defined above: and Y' corresponds in its meaning to Y, but may additionally represent —NH—.

Monofunctional polyethers are preferably used, but preferably only in molar quantities of 10%, based on the polyisocyanate used, to guarantee the required high molecular weight structure of the polyurethane elastomers. In cases where relatively large molar quantities of monofunctional alkylene oxide polyethers are used, it is advantageous also to use trifunctional compounds containing isocyanate-reactive hydrogen atoms, although the average functionality of the synthesis components should preferably not exceed about 2.1 in order to obtain substantially linear prepolymers.

The monofunctional hydrophilic synthesis components are produced in accordance with the processes described in U.S. Pat. Nos. 3,905,929 and 3,920,598 by alkoxylating of a monofunctional starter, such as n-butanol or n-methyl butylamine, using ethylene oxide and optionally another alkylene oxide, for example, propylene oxide. The resultant product may be optionally further modified (although this is less preferred) by reaction with excess quantities of diisocyanates or by reaction with ammonia to form the corresponding primary aminopolyethers.

The isocyanate-terminated prepolymers of the present invention are prepared by reacting the polyisocyanate component with the organic component containing at least 2 isocyanate-reactive groups, the component containing at least one anionic group or at least one potential anionic group and, optionally, the component containing hydrophilic ethylene oxide units. Potential anionic groups are groups which may be converted to anionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers; whereas, a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the amount of unreacted isocyanate-reactive groups is essentially zero. The finished prepolymer should have a free isocyanate content of about 1 to 8%, preferably about 1 to 5% by weight, based on the weight of prepolymer solids. The molecular weight of the prepolymer should be less than about 25,000, preferably between about 600 and 12,000. It is possible to conduct the prepolymer reaction in the presence of a catalyst known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon pyrrolidones, e.g., N-methyl-2-pyrrolidinone, hydrogenated furans, aromatic hydrocarbons, and the like, and mixtures thereof. The amount of solvent employed, if any, can vary widely. The amount of solvent employed should be sufficient to provide a prepolymer solution having a sufficiently low viscosity to enhance the formation of the urea-urethane dispersion of this invention; however, the solutions may be successfully employed in forming the dispersions even though the viscosity of the solution is relatively high at the temperature of dispersion. Such viscosities may be as low as 100 centipoise or above 10,000 centipoise, e.g., at least about 12,000 or 15,000 centipoise, and only mild agitation need be employed to form the dispersion, even in the absence of an external emulsifying agent. Often about 0.01 to 10 parts by weight of solvent, preferably about 0.02 to 2 parts by weight of solvent, per part by weight of the prepolymer can be used. However, the presence of a solvent for the prepolymer or the urea-urethane is not necessary to provide a stable, aqueous dispersion. Often, when solvent is employed during the preparation of the isocyanate-terminated prepolymer and/or the urea-urethane polymer it is desirable to remove at least a portion of the solvent from the aqueous dispersion. Advantageously, the solvent to be removed from the dispersion has a lower boiling point than water and thus can be removed from the dispersion by, for example, distillation. The removal of the low boiling solvent is desirably conducted under conditions which are not deleterious to the urea-urethane polymer such as vacuum distillation or thin film evaporation conditions. A solvent having a higher boiling point than water such as dimethyl formamide, N-methyl-2-pyrrolidinone, and the like, may be employed, in which case the higher boiling solvent is generally retained in the aqueous dispersion of urea-urethane polymer to enhance the coalescence of the urea-urethane polymer particles during film formation.

After the prepolymer is formed it may optionally contain the hydrophilic ethylene oxide units in addition to either anionic groups or potential anionic groups. The potential anionic groups may be converted into hydrophilic anionic groups by treatment with a neutralizing agent such as an alkali metal salt or a volatile or organic compound such as ammonia or a primary, secondary or preferably tertiary amine in an amount sufficient to render the isocyanate-terminated prepolymers water-dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile organic compounds since they lead to reduced resistance to water swell in the coatings produced from the water-dispersible compositions of the present invention. Therefore, less than 50%, preferably less than 20% and most preferably none of the acid groups should be neutralized with alkali metals.

The preferred volatile organic compounds for neutralizing the acid groups are the tertiary amines, while ammonia and the primary and secondary amines are less preferred. Examples of suitable amines include trimethyl amine, triethyl amine, triisopropyl amine, tributyl amine, N,N-dimethyl-cyclohexyl amine, N,N-dimethyl-stearyl amine, N,N-dimethylaniline, N-methylmorpholine, N-ethylmorpholine, N-methylpiperazine, N-methylpyrrolidine, N-methylpiperidine, N,N-dimethylethanol amine, N,N-diethylethanol amine, triethanol amine, N-methyl-diethanol amine, dimethylaminopropanol, 2-methoxyethyldimethyl amine, N-hydroxy-ethylpiperazine, 2-(2-dimethylaminoethoxy)-ethanol and 5-diethylamino-2-pentanone. The most preferred tertiary amines are those which do not contain isocyanate-reactive groups as determined by the Zerewitinoff test since they are capable of reacting with isocyanate groups during the curing of the compositions of the present invention.

In a preferred embodiment of the present invention volatile tertiary amines are used so that when the water-dispersible coating compositions of the subject application cure at elevated temperatures, the tertiary amine volatilizes and is removed from the coated substrate. The reformed carboxylic or sulfonic acid groups may then react with the epoxide ring of the epoxy resin component thus generating an additional hydroxyl group for subsequent cross-linking with an isocyanate group.

When the potential anionic groups of the prepolymer are neutralized, they provide hydrophilicity to the prepolymer and better enable it to be stably dispersed in water. The potential or unneutralized anionic groups do not provide this degree of hydrophilicity. Accordingly, a sufficient amount of the potential anionic groups must be neutralized so that when combined with the optional hydrophilic ethylene oxide units, the polyurethane-urea final product will be a stable, colloidal dispersion. When large amounts of potential and ionic groups are incorporated into the prepolymer, only a portion of these groups may need to be neutralized to provide the necessary amount of hydrophilicity. However, when small amounts of potential and ionic groups are incorporated, it may be necessary to neutralize substantially all of these groups to obtain the desired amount of hydrophilicity. No firm guidelines can be given as to the amount of neutralization needed with the exception of the previously disclosed ranges of anionic groups, since the dispersibility of the polyurethane-ureas depend on many factors including, but not limited to, the amount of hydrophilicity provided by the optional ethylene oxide units.

The neutralization steps may be conducted (1) prior to prepolymer formation by treating the component containing the potential anionic group(s) or (2) after prepolymer formation, but prior to dispersing the prepolymer or (3) by adding the neutralizing agent to all or a portion of the dispersing water. The reaction between the neutralizing agent and the potential and ionic groups may be conducted between about 20° C. and 150° C., but is normally conducted at temperatures below about 100° C., preferably between about 30 and 80° C. and most preferably between about 50° and 70° C., with agitation of the reaction mixture.

After neutralization according to alternatives 1 or 2 above (or during neutralization if alternative 3 is used) and after the prepolymer has been admixed with the previously described epoxy resin, a dispersion of this mixture in water may be formed according to the following methods.

(1) Water is added to the prepolymer/epoxy resin mixture with agitation. During this process, the viscosity of the mixture increases significantly, since initially the organic phase is continuous. As the addition of water is continued, a point is reached where a phase change occurs and the aqueous phase becomes continuous and the viscosity decreases. The remaining portion of the water is then added. If alternative 3 is used for neutralization, then it is important that sufficient anionic groups be present to produce a stable dispersion at the point of phase change when combined with the hydrophilic effect of the optional ethylene oxide units. This problem may be obviated by adding all of the neutralizing agent with a portion of the dispersing water which is insufficient to cause the phase change, followed by the addition of the remaining water. This problem may also be overcome by incorporating excess hydrophilic ethylene oxide units and/or potential anionic groups into the prepolymer, or by using an excess of the neutralizing agent. These latter methods, although less preferred, will ensure that the prepolymer is sufficiently hydrophilic at the point of phase change to form a stable dispersion.

(2) The prepolymer/epoxy resin mixture is added to the water, either in a batch-type process or continuously by using continuous static or dynamic mixing devices, including low shear dynamic mixers. When this method is used, significant increases in viscosity do not occur. In addition, if alternative 3 is used for neutralization, all of the neutralization agent is present in the water prior to the addition of the prepolymer.

The prepolymer/epoxy resin mixture is usually added in increments to the water or water/neutralizing agent mixture unless continuous mixing devices are used. The aqueous mixture is preferably agitated during the addition of the prepolymer/epoxy resin mixture to assist in forming the dispersion. Any low boiling solvent present during prepolymer formation may be removed prior to dispersing the prepolymer/epoxy resin mixture; however, it is preferred to remove the solvent after the dispersion is formed since the solvent will facilitate the formation of the dispersion, and also, the subsequent reaction of the prepolymer portion of the mixture with the polyamine. The presence of solvent is especially preferred when the dispersion is formed according to method 1, since it helps to reduce the viscosity peak normally encountered with this process.

After the prepolymer/epoxy resin mixture has been dispersed, the polyamine should be added before the reaction of the terminal isocyanate groups with water proceeds to any significant extent, normally within about 30 minutes, preferably within about 15 minutes. Since the isocyanate groups of the prepolymer are sufficiently more reactive with the polyamine than the epoxide groups of the epoxy resin, the amount of reaction between the polyamines and the epoxide groups is negligible, provided that the number of amino groups of the polyamine are equal to or less than the number of isocyanate groups of the prepolymers.

The polyurethane-urea products of the present invention are formed by reacting the dispersed prepolymer with a polyamine or a mixture of polyamines. The average functionality of the amine, i.e., the number of amine nitrogens per molecule or the number of primary and secondary amino groups, should be between about 2.0 and 6.0, preferably between about 2.2 and 4 and most preferably between about 2.2 and 3. The desired functionalities can be obtained by using mixtures of polyamines. For example, a functionality of 2.5 can be achieved by using equimolar mixtures of diamines and triamines. A functionality of 3.0 can be achieved either by using (1) triamines,
(2) equimolar mixtures of diamines and tetramines,
(3) mixtures of 1 and 2, or
(4) any other suitable mixtures.

These other suitable mixtures for obtaining the desired functionalities will be readily apparent to those of ordinary skill in the art.

Suitable amines are essentially hydrocarbon polyamines containing 2 to 6 amino groups which have isocyanate-reactive hydrogens according to the Zerewitinoff test, i.e., primary or secondary amino groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)piperazine, N,N,N'-tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,6-diaminohexane, ethylene diamine, diethylene triamine, triethylene tetramine, tetraethylene pentamine and pentaethylene hexamine.

The amount of polyamine to be used in accordance with the present invention is dependent upon the number of terminal isocyanate groups in the prepolymer. Generally, the ratio of terminal isocyanate groups of the prepolymer to primary and secondary amino groups of the polyamine is between about 1.0:0.6 and 1.0:1.0, preferably between about 1.0:0.6 and 1.0:0.98 and most preferably 1.0:0.8 and 1.0:0.95 on an equivalent basis. Lesser amounts of polyamine will allow for too much undesired reaction of the isocyanate groups with water, while an undue excess may lead to reactions between the amino groups and epoxide groups.

The reaction between the dispersed prepolymer and the polyamine is conducted at temperatures of about 5° to 90° C., preferably about 20° to 80° C., and most preferably about 30° to 70° C. The reaction conditions are normally maintained until the isocyanate groups are essentially completely reacted. In order to reduce the presence of localized concentration gradients, the polyamine is preferably added in increments to the dispersed prepolymer/epoxy resin mixture which is normally agitated to ensure complete mixing of the polyamine throughout the aqueous medium. The polyamine may also be added to the dispersed mixture continuously by using continuous static or dynamic mixing devices, including low shear dynamic mixers. The polyamine may be added to the aqueous medium in its pure form or it may be dissolved or dispersed in water and/or an organic solvent. Suitable organic solvents are those previously described for use in preparing the isocyanate-terminated prepolymer.

The final product is a stable, aqueous dispersion of colloidally-sized particles of polyurethane-ureas which also contains the co-dispersed epoxy resin. The particle size is generally below about 1.0 micron, and preferably between about 0.001 to 0.5 micron. The average particle size should be less than about 0.5 micron, and preferably between 0.01 to 0.3 micron. The small particle size enhances the stability of the dispersed particles and also leads to the production of films with high surface gloss.

The aqueous dispersions of the present invention may be used for the same applications as the known aqueous dispersions, especially those which require humidity resistance. Examples of these uses may be found in U.S. Pat. No. 4,408,008, herein incorporated by reference.

The invention is further illustrated, but is not intended to be limited by the following examples in which all parts and percentages are by weight unless otherwise specified.

EXAMPLES

EXAMPLES 1–12

Preparation of NCO prepolymer 163.8 parts of a polyester polyol having a molecular weight of 840 and prepared from 1,6-hexane diol and adipic acid, 22.0 parts of neopentyl glycol, 17.2 parts of α,α-dimethylolpropionic acid, 6.8 parts of a polyether monohydric alcohol having a molecular weight of 2145 and prepared from n-butanol, ethylene oxide and propylene oxide (molar ratio of oxides - 83:17) and 197.8 parts of N-methylpyrrolidinone were combined and heated to 70° C. To the homogeneous mixture 210.9 parts of 4,4'-dicyclohexylmethane diisocyanate were added. The mixture was stirred and heated to 105° C. for approximately 2 hours. The free isocyanate content was determined to be 3.5%.

Preparation of Epoxy Modified Dispersion

To 200.0 part aliquots of the NCO prepolymer were added 4.1 parts of triethylamine, 2.2 parts of an external emulsifier (ethoxylated nonylphenol having a molecular weight of 1540, Surfonic N-300 available from Jefferson Chemical Co.) and the amounts listed in the following Table of the given epoxy resins. Each mixture was heated to 70° C. and then added to 175.0 parts of vigorously stirred distilled water (35° C.) over a 5-minute period. A solution of 2.4 parts ethylenediamine, 2.0 parts isophorone diamine, 1.3 parts diethylenetriamine and 20.0 parts distilled water was added to each dispersion over a 3-minute period. Each dispersion was heated to 70° C. and stirred at that temperature for 2 hours.

| Composition of Epoxy Modified Dispersion | | | | |
|---|---|---|---|---|
| Example No. | Epoxy Resin | Epoxy Amount (grams) | Epoxy % | Solids % |
| 1 | None | 0.0 | 0.0 | 35.5 |
| 2 | Epoxy 1* | 1.4 | 1.0 | 37.2 |
| 3 | Epoxy 1 | 1.2 | 0.8 | 35.9 |
| 4 | Epoxy 1 | 0.8 | 0.5 | 37.0 |
| 5 | Epoxy 1 | 0.36 | 0.25 | 36.9 |
| 6 | Epoxy 2* | 2.9 | 2.0 | 36.4 |
| 7 | Epoxy 3* | 2.9 | 2.0 | 36.7 |
| 8 | Epoxy 4* | 2.8 | 2.0 | 37.6 |
| 9 | Epoxy 1 | 7.0 | 5.0 | 37.3 |
| 10 | Epoxy 1 | 14.0 | 10.0 | 36.9 |
| 11 | Epoxy 1 | 28.0 | 20.0 | 36.5 |
| 12 | Epoxy 5* | 2.8 | 2.0 | 35.7 |

*epoxy % is the percentage of epoxy solid based on the total weight of polyurethane-urea solids plus epoxy resin solids.

Epoxy 1—a bisphenol A-based diepoxide having an epoxide equivalent weight of about 185 to 192, available as Epon 828 from Shell Chemical Corp.

Epoxy 2—a bisphenol A-based polyepoxide having an epoxide equivalent weight of about 450 to 550, available as Epon 1001 from Shell Chemical Corp.

Epoxy 3—a bisphenol A-based diepoxide having an epoxide equivalent weight of about 175–195, available as Epon 815 from Shell Chemical Corp.

Epoxy 4—a cycloaliphatic diepoxide ester available as Araldite CY 179 from Ciba-Geigy and having the structural formula

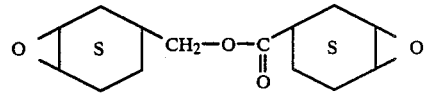

Epoxy 5—1,2-epoxy-3-phenoxy propane.

| | STORAGE STABILITY | | | | | |
|---|---|---|---|---|---|---|
| | Initial | | 2 Weeks | | 2 Months | |
| EXAMPLE | pH | visc. | pH | visc. | pH | visc. |
| 2 | 8.80 | 405 | — | — | 8.91 | 280 |
| 3 | 8.76 | 105 | — | — | 9.00 | 120 |
| 4 | 8.95 | 75 | — | — | 9.06 | 85 |
| 5 | 8.92 | 215 | — | — | 8.90 | 180 |
| 6 | 8.68 | 50 | — | — | 8.80 | 55 |
| 7 | 9.54 | 110 | — | — | 9.57 | 105 |
| 8 | 8.38 | 85 | — | — | 9.00 | 100 |
| 9 | 9.39 | 245 | 10.02 | 180 | 10.35 | 4000 |
| 10 | 10.31 | 145 | Solid | | Solid | |
| 11 | 9.54 | 110 | — | — | 9.57 | 105 |
| 12 | 9.65 | 245 | 9.75 | 195 | — | — |

| | STEEL PANELS | | | | | |
|---|---|---|---|---|---|---|
| | MEK | Impact | | Hardness | | Spot |
| Example No. | Double Rubs | Forward | Reverse | Pencil | Pendulum | Test IPA |
| 1 (Comp) | 10 | 160 lb. pass | 160 lb. pass | 2H | 75 sec. | 5 min. fail |
| 2 | 20 | 160 lb. pass | 160 lb. pass | 2H | 85 sec. | 15 min. fail |
| 3 | 20 | 160 lb. pass | 160 lb. pass | 2H | 86 sec. | 20 min. fail |
| 4 | 25 | 160 lb. pass | 160 lb. pass | 2H | 86 sec. | 15 min. fail |
| 5 | 20 | 160 lb. pass | 160 lb. pass | 2H | 84 sec. | 20 min. fail |
| 6 | 20 | 160 lb. | 160 lb. | 4H | 87 sec. | 5 min. |

-continued

| Example No. | STEEL PANELS | | | | | |
|---|---|---|---|---|---|---|
| | MEK Double Rubs | Impact Forward | Impact Reverse | Hardness Pencil | Hardness Pendulum | Spot Test IPA |
| 7 | 100+ | 160 lb. pass | 160 lb. pass | 4H | 89 sec. | fail 8 hr. pass |
| 8 | 75 | 160 lb. pass | 160 lb. pass | 2H | 85 sec. | 8 hr. pass |
| 9 | 100+ | 160 lb. pass | 160 lb. pass | 2H | 90 sec. | 24 hr. pass |
| 10 | 100+ | 160 lb. pass | 160 lb. pass | 2H | 90 sec. | 24 hr. pass |
| 11 | 100+ | 160 lb. pass | 160 lb. pass | HB | 93 sec. | 24 hr. pass |
| 12 | 100 | 160 lb. pass | 160 lb. pass | 4H | 95 sec. | 24 hr. pass |

| Example No. | TENSILE PROPERTIES | | | | | |
|---|---|---|---|---|---|---|
| | Initial | | 1 wk. Hydrolysis | | 2 wk. Hydrolysis | |
| | Fail psi | Ult. Elong. | Fail psi | Ult. Elong. | Fail psi | Ult. Elong. |
| 1 (Comp) | 4502 | 100 | Too brittle to test | | Too brittle to test | |
| 2 | 5534 | 110 | 4167 | 35 | Too brittle to test | |
| 3 | 6005 | 180 | 4646 | 35 | Too brittle to test | |
| 4 | 5322 | 158 | 4836 | 15 | Too brittle to test | |
| 5 | 5326 | 158 | 4518 | 15 | Too brittle to test | |
| 6 | 5972 | 175 | 4251 | 10 | Too brittle to test | |
| 7 | 5601 | 167 | 5075 | 40 | Too brittle to test | |
| 8 | 6105 | 170 | 4086 | 43 | Too brittle to test | |
| 9 | 6943 | 167 | 5965 | 123 | 6053 | 65 |
| 10 | 7082 | 150 | 5134 | 46 | 6121 | 30 |
| 11 | 6648 | 128 | 5227 | 100 | 6105 | 47 |
| 12 | 7107 | 177 | 4601 | 25 | Too brittle to test | |

EXAMPLES 13–18

Preparation of NCO Prepolymer 187.0 parts of the polyester polyol from Example 1, 14.9 parts of α,α-dimethylolpropionic acid, 3.2 parts of the polyether monohydric alcohol from Example 1, and 82.1 parts of N-methyl pyrrolidinone were combined and heated to 70° C. 114.0 parts of 4,4'-dicyclohexylmethane diisocyanate were added to the homogeneous mixture. The mixture was stirred and heated to 105° C. for approximately 2 hours. The free isocyanate content was determined to be 2.0%.

Preparation of Epoxy Modified Dispersion

To 200.0 part aliquots of the NCO prepolymer were added 5.4 parts of triethylamine, 28.3 parts of N-methyl pyrrolidinone and the amounts listed in the following Table of the given epoxy resins. Each mixture was heated to 70° C. and then added to 175.0 parts of vigorously stirred distilled water (35° C.) over a 5-minute period. A solution of 2.5 parts diethylenetriamine and 31.5 parts distilled water was added to each dispersion over a 3-minute period. Each dispersion was heated to 70° C. and stirred at that temperature for 2 hours.

| Example No. | Composition of Epoxy Modified Dispersion | | | |
|---|---|---|---|---|
| | Epoxy Resin | Epoxy Amount (grams) | Epoxy % | Solids % |
| 13 (Comp) | None | 0.0 | 0.0 | 30.0 |
| 14 | Epoxy 1 | 2.9 | 2.0 | 30.0 |
| 15 | Epoxy 1 | 7.2 | 5.0 | 30.0 |
| 16 | Epoxy 1 | 11.5 | 8.0 | 30.0 |
| 17 | Epoxy 1 | 14.4 | 10.0 | 30.0 |
| 18 | Epoxy 5 | 2.9 | 2.0 | 30.0 |

| Example No. | STORAGE STABILITY | | | | | |
|---|---|---|---|---|---|---|
| | Initial | | 2 wk. | | 2 Months | |
| | pH | Visc. | pH | Visc. | pH | Visc. |
| 13 (Comp) | 9.15 | 315 | 9.16 | 300 | 9.02 | 270 |
| 14 | 9.41 | 120 | 9.63 | 100 | 9.62 | 80 |
| 15 | 9.87 | 125 | 9.65 | 85 | 9.64 | 74 |
| 16 | 9.83 | 165 | 10.33 | 85 | Solid @ 1 mo. | |
| 17 | 9.93 | 185 | 10.48 | 65 | Solid @ 1 mo. | |
| 18 | 9.65 | 930 | 9.72 | 520 | — | — |

| Example No. | STEEL PANELS | | | | | |
|---|---|---|---|---|---|---|
| | MEK Double Rubs | Impact Forward | Impact Reverse | Hardness Pencil | Hardness Pendulum | Spot Test IPA |
| 13 (Comp) | 100 | 160 lb. pass | 160 lb. pass | 2H | 26 sec. | 24 hr. pass |
| 14 | 40 | 160 lb. pass | 160 lb. pass | 2H | 25 sec. | 24 hr. pass |
| 15 | 50 | 160 lb. pass | 160 lb. pass | 2H | 27 sec. | 24 hr. pass |
| 16 | 70 | 160 lb. pass | 160 lb. pass | HB | 32 sec. | 24 hr. pass |
| 17 | 70 | 160 lb. pass | 160 lb. pass | HB | 30 sec. | 24 hr. pass |
| 18 | 30 | 160 lb. pass | 160 lb. pass | 2H | 28 sec. | 24 hr. pass |

| Example No. | TENSILE PROPERTIES | | | | | |
|---|---|---|---|---|---|---|
| | Initial | | 1 wk. Hydrolysis | | 2 wk. Hydrolysis | |
| | Fail psi | Ult. Elong. | Fail psi | Ult. Elong. | Fail psi | Ult. Elong. |
| 13 (Comp) | 6506 | 310 | Film dissolved | | Film dissolved | |
| 14 | 6043 | 273 | 1294 | 383 | Film dissolved | |
| 15 | 5733 | 243 | 4039 | 282 | 1412 | 230 |
| 16 | 5675 | 257 | 4125 | 177 | 3267 | 160 |
| 17 | 4300 | 207 | 4045 | 147 | 3193 | 133 |
| 18 | 5339 | 307 | 463 | 282 | Film dissolved | |

EXAMPLES 19–23

Preparation of Higher Acid-Content Prepolymer 204.8 parts of the polyester polyol from Example 1, 57.1 parts of α,α-dimethylolpropionic acid, 8.4 parts of the polyether monohydric alcohol from Example 1 and 251.2 parts of N-methylpyrrolidinone were combined and heated to 70° C. 263.6 parts of 4,4'-dicyclohexylmethane diisocyanate were added to the homogeneous mixture. The mixture was stirred and heated to 105° C. for approximately 2 hours. The free isocyanate content was determined to be 3.6%.

Preparation of Epoxy Modified Dispersion With Higher Acid Content

To 200.0 part aliquots of the higher acid content NCO prepolymer were added 10.4 parts of triethylamine, 2.2 parts of the external emulsifier of Example 1 an the amounts listed in the following Table 1 of the given epoxy resins. Each mixture was heated to 70° C. and then added to 175.0 parts of vigorously stirred distilled water (35° C.) over a 5-minute period. A solution of 2.4 parts ethylenediamine, 2.2 parts isophoronediamine, 1.3 parts diethylenetriamine and 20.0 parts of distilled water was added to each dispersion over a 3-minute period. Each dispersion was heated to 70° C. and stirred at that temperature for 2 hours.

Composition of Epoxy-Modified Dispersion With Higher Acid Content

| Example | Epoxy Resin | Amount (grams) | % Epoxy | % Solids |
|---|---|---|---|---|
| 19 | None | 0.0 | 0.0 | 28.0 |
| 20 | Epoxy 1 | 7.0 | 5% | 28.0 |
| 21 | Epoxy 1 | 14.0 | 10% | 28.0 |
| 22 | Epoxy 1 | 21.0 | 15% | 28.0 |
| 23 | Epoxy 1 | 28.0 | 20% | 11.0* |

*additional water added to reduce viscosity.

STORAGE STABILITY

| Example | Initial pH | visc. | 2 weeks pH | Visc. | 2 months pH | Visc. | 6 months pH | Visc. |
|---|---|---|---|---|---|---|---|---|
| 20 | 9.83 | 3200 | 9.78 | 3000 | 9.70 | 2000 | 9.50 | 1360 |
| 21 | 9.83 | 2600 | 9.81 | 2400 | 9.76 | 1620 | 9.56 | 1320 |
| 22 | 10.14 | 500 | 10.10 | 340 | 10.01 | 265 | 9.80 | 195 |
| 23 | 10.37 | 740 | 10.26 | 580 | 10.06 | 760 (sep.)* | 9.17 | 660 |

*some separation of the aqueous and organic phases was noted

HYDROLYTIC STABILITY OF FILMS PREPARED FROM HIGHER ACID CONTENT EPOXY-MODIFIED DISPERSIONS

| Example No. | Initial Fail psi | Ult. Elong. | 1 wk. Hydrolysis Fail psi | Ult. Elong. | 2 wk. Hydrolysis Fail psi | Ult. Elong. |
|---|---|---|---|---|---|---|
| 19 (Comp) | 4817 | 110 | Too brittle to test | | Too brittle to test | |
| 20 | 5348 | 53 | Too brittle to test | | Too brittle to test | |
| 21 | 6498 | 20 | 5605 | 10 | Too brittle to test | |
| 22 | 6921 | 23 | 6784 | 17 | 6747 | 20 |
| 23 | 8044 | 10 | 6476 | 10 | 6250 | 10 |

EXAMPLES 24–27

Fresh dispersions were prepared by repeating Comparison Example 1 (Example 24) and Example 9 (Example 25). For Example 26 a fresh dispersion was prepared using the NCO prepolymer of Examples 1–12. To 200 parts of the NCO prepolymer were added 4.1 parts of triethylamine and 2.2 parts of the external emulsifier of Example 1 followed by stirring and heating to 70° C. 185.7 parts of the neutralized NCO prepolymer was dispersed in 172.0 parts of distilled water at 40° C. and was immediately chain extended by the dropwise addition of a solution of 12.0 parts of isophorone diamine and 20.0 parts of water. The resulting dispersion was stirred for 1 hr. at 70° C.

For Example 27 a fresh dispersion was again prepared using the NCO prepolymer of Examples 1–12. To 200 parts of the NCO prepolymer were added 4.1 parts of triethylamine, 2.2 parts of the external emulsifier of Example 1 and 7.2 parts of Epoxy 1 followed by stirring and heating to 70° C. 192.2 parts of the neutralized NCO prepolymer were dispersed in 172.4 parts of distilled water and chain extended as in Example 26. The resulting dispersion was stirred for 1 hr. at 70° C.

Films were made from these dispersions (10 mil WFT on glass, flash off for 30 min @ R.T. and baked 10 min @ 150° C.). The films were removed from the glass and soaked in water for 21 hr. at R.T. The tensile moduli of the wet films were then determined and are included in the Table. No improvement in the wet strength of the films containing the epoxy resin (Examples 25 and 27) was shown compared to the films not containing the epoxy resin (Examples 24 and 26).

TABLE

| EXAMPLE | MODULUS (psi) FAILURE INITIAL | AFTER WATER TREATMENT | RETENTION OF PROPERTIES (%) |
|---|---|---|---|
| 24 | 6251 | 4158 | 66 |
| 25 | 5916 | 4129 | 70 |
| 26 | 6326 | 4158 | 66 |
| 27 | 6658 | 4622 | 69 |

The following procedures were used to obtain the data set forth in the preceding examples.

The MEK double rubs impact, hardness and IPA spot test were conducted by making a 5 mil wet drawdown of the dispersions on Bonderite treated test panels (24 gauge cold rolled steel-flat polished, 3"×9", available from Oxy Metal Industries Corporation), flashing off the films for 30 min. at R.T. and baking them for 10 min. at 150° C.

(1) The MEK double rubs were measured by wetting a cloth with methylethyl ketone and rubbing the cloth across the coating until the coating was removed; each back and forth motion constituting one rub. The isopropyl alcohol spot test was conducted by soaking a cotton ball with isopropyl alcohol and placing it on the film, covered by a watch glass. The film was then checked periodically for the following:
(a) no effects,
(b) whitening,
(c) softening (cotton sticks to film),
(d) blistering, and
(e) dissolving.

(2) The Gardner impact was determined according to D 3029-84, method G.

(3) The pencil hardness was determined according to ASTM D 3363 with a Micometrics Company pencil hardness gauge.

(4) The Ericksen pendulum hardness was determined by casting a film of the coating composition to be evaluated on a Bonderite treated test panel (24 guage cold rolled steel-flat polished, 3"×9") with a 5 mil wet drawdown bar. The Ericksen pendulum hardness tester was levelled, and at the desired interval of measurement the steel panel was placed on the sample stage of the hardness tester. The fulcrum points of the pendulum were lowered onto the curing film and the pendulum was deflected 6° and released. The time for the pendulum to damp to a 3° deflection was recorded.

(5) The tensile properties were determined according to ASTM D 638 using a Type 4 die. Free films were prepared by making a 10 mil wet drawdown of the dispersions on glass, flashing off the films for 30 min. at R.T., baking them for 10 min. at 150° C. and subsequently removing the films from the glass prior to testing. The one and two week hydrolysis resistance test was conducted by placing the films in an environmental chamber maintained at 70° C. and 95% relative humidity prior to testing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, aqueous dispersion of polyurethane-ureas in admixture with an epoxy resin which is formed by a process which comprises
    (a) preparing an isocyanate-terminated prepolymer containing about 5 to 190 milliequivalents per 100 grams of polyurethane-urea of chemically incorporated potential anionic groups and/or anionic groups, and up to about 10% by weight, based on the weight of the polyurethane-urea, of lateral and/or terminal hydrophilic chains containing ethylene oxide units,
    (b) converting a sufficient amount of said potential anionic groups to anionic groups either before, during or after preparing said prepolymer such that the blend of step (c) can be stably dispersed in water, wherein at least about 50% of the counterions of said anionic groups are derived from volatile organic compounds,
    (c) blending said prepolymer either before, during or after step (b) with an epoxy resin which is not self-dispersible in water and contains at least one epoxide group, such that the equivalent ratio of potential anionic groups and anionic groups having counterions derived from volatile organic compounds to epoxide groups is about 0.2 to 20.0,
    (d) dispersing the blend of prepolymer and epoxy resin in water and
    (e) chain extending said prepolymer with a polyamine having an average functionality of about 2.0 to about 6.0 in an amount sufficient to provide a ratio of amino groups to isocyanate groups of about 0.6:1.0 to 1.0:1.0.

2. The aqueous dispersion of claim 1 wherein said chemically incorporated potential anionic groups and/or anionic groups comprise carboxylate and/or carboxylic acid groups.

3. The aqueous dispersion of claim 2 wherein said volatile organic compounds are volatile tertiary amines.

4. The aqueous dispersion of claim 1 wherein said epoxy resin is an aromatic epoxy resin having at least two epoxide groups.

5. The aqueous dispersion of claim 4 wherein said aromatic epoxy resin is a bisphenol A-based epoxide.

6. The aqueous dispersion of claim 1 wherein said prepolymer contains about 10 to 120 milliequivalents per 100 grams of polyurethane-urea of chemically incorporated potential anionic groups and/or anionic groups.

7. The aqueous dispersion of claim 1 wherein said prepolymer contains about 20 to 80 milliequivalents per 100 grams of polyurethane-urea of chemically incorporated potential anionic groups and/or anionic groups.

8. A stable, aqueous dispersion of polyurethane-ureas in admixture with an epoxy resin which is formed by a process which comprises
    (a) preparing an isocyanate-terminated prepolymer containing about 10 to 120 milliequivalents per 100 grams of polyurethane-urea of chemically incorporated carboxylic acid and/or carboxylate groups, and up to about 10% by weight, based on the weight of the polyurethane-urea, of lateral and/or terminal hydrophilic chains containing ethylene oxide units,
    (b) converting a sufficient amount of carboxylic acid groups to carboxylate groups either before, during or after preparing said prepolymer such that the blend of step (c) can be stably dispersed in water, wherein at least about 80% of the counterions of said carboxylate groups are derived from volatile tertiary amines,
    (c) blending said prepolymer either before, during or after step (b) with an epoxy resin which is not self-dispersible in water and contains at least two epoxide groups, such that the equivalent ratio of carboxylic acid groups and carboxylate groups having counterions derived from volatile tertiary amines to epoxide groups is about 0.5 to 15.0,
    (d) dispersing the blend of prepolymer and epoxy resin in water and
    (e) chain extending said prepolymer with a polyamine having an average functionality of about 2.0 to 6.0 in an amount sufficient to provide a ratio of amino groups to isocyanate groups of about 0.6:1.0 to 1.0:1.0.

9. The aqueous dispersion of claim 8 wherein said epoxy resin is an aromatic epoxy resin.

10. The aqueous dispersion of claim 9 wherein said aromatic epoxy resin is a bisphenol A-based epoxide.

11. The aqueous dispersion of claim 8 wherein said polyamine has an average functionality of about 2.2 to 4.0 and is present in an amount sufficient to provide a ratio of amino groups to isocyanate groups of about 0.6:1.0 to 0.98:1.0.

12. The aqueous dispersion of claim 8 wherein said prepolymer contains about 20 to 80 milliequivalents per 100 grams of polyurethane-urea of chemically incorporated potential anionic groups and/or anionic groups.

13. The aqueous dispersion of claim 8 wherein the reactants for preparing said prepolymer comprise a member selected from the group consisting of dihydroxy polyesters, dihydroxy polylactones, dihydroxy polycarbonates and dihydroxy polyester carbonates.

14. A coated substrate which is prepared by coating a substrate with the aqueous dispersion of claim 1.

* * * * *